Patented Dec. 23, 1952

2,623,070

UNITED STATES PATENT OFFICE 2,623,070

PREPARATION OF HYDRACRYLAMIDES BY THE AMINOLYSIS OF BETA-LACTONE POLYMERS

Jacob Eden Jansen, Akron, Ohio, assignor to The B. F. Goodrich Company, New York, N. Y., a corporation of New York No Drawing. Application October 12, 1950, Serial No. 189,899

6 Claims. (Cl. 260—561)

This invention relates to a method for preparing amides of beta-hydroxy carboxylic acids such as hydracrylic acid and pertains particularly to the preparation of such compounds by the aminolysis of linear polyesters derived from saturated aliphatic beta-lactones such as beta-propiolactone.

It is disclosed in U. S. Patent 2,356,459 to Frederick E. Küng that beta-lactones, that is, lactones or inner esters of beta-hydroxy carboxylic acids may be obtained in good yields by the reaction of a ketone with an aldehyde or ketone. In this manner beta-propiolactone (also called hydracrylic acid lactone), which has the formula

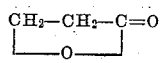

is economically obtained from ketene and formaldehyde. Similarly, by variations in the reactants, there may be obtained other saturated aliphatic beta-lactones, homologous with beta-propiolactone and possessing the general formula

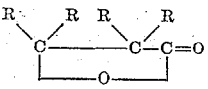

wherein each R (here and wherever appearing hereinafter) is hydrogen or an alkyl group such as methyl, ethyl, propyl, butyl or the like. Typical examples of such beta-lactones include beta-butyrolactone, beta-isobutyrolactone, beta-n-valerolactone, beta-isovalerolactone, beta-isopropyl - beta - propiolactone, beta - ethyl - beta-butyrolactone, alpha-methyl-beta-propiolactone, alpha, alpha-dimethyl-beta-propiolactone, alpha, beta-dimethyl-beta-propiolactone, alpha, beta, beta-trimethyl-beta-propiolactone and the like.

All these beta-lactones are readily converted by a variety of methods, as will be set forth hereinbelow, into linear polyesters containing a plurality of beta-lactone units connected to one another, i. e., they possess the structure

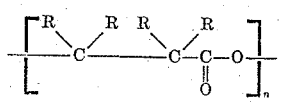

$n$ being a number greater than 1.

I have now discovered that such linear polyesters react readily with ammonia and amines to form amides of beta-hydroxy carboxylic acids in high yields, in accordance with the general reaction equation:

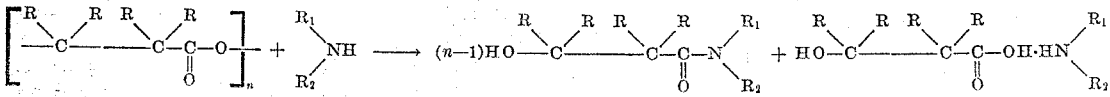

wherein each of $R_1$ and $R_2$ is selected from the class consisting of hydrogen, alkyl and aryl and $n$ is a number greater than 1. Thus, in this manner amides of hydracrylic acid are readily obtained from linear polyesters derived from beta-propiolactone and, in a similar manner, amides of other beta-hydroxy aliphatic monocarboxylic acids are secured from linear polyesters derived from the other aliphatic beta-lactones mentioned above.

As mentioned hereinabove, the linear polyesters derived from beta-propiolactone or a homolog thereof and used in the reaction of this invention are characterized chemically by possessing a plurality of units of the structure

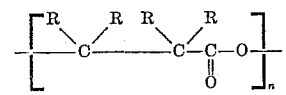

The nature of the end groups connected to this structure is of no consequence in this invention since amides of beta-hydroxy acids are obtained by reaction with amines in any case. However, the valence at the right of the above structure is generally satisfied by a hydrogen atom (in which event the linear polyester is more appropriately called a linear polyester acid) or by an alkyl group (in which event the linear polyester is an alkyl ester of a polyester acid). The end group at the left of the above structure varies with the method by which the linear polyester is obtained and is generally an acyloxy group preferably one of the formula

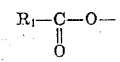

wherein $R_1$ is a hydrocarbon group such as alkyl, alkenyl, aryl, or the like; or it is an alkoxy or hydroxy or a halogen atom. Also, the value of $n$ varies with the conditions under which the linear polyester is obtained and may be as small as 2 or as great as 50 or even greater. Physically, the linear polyesters vary in character from colorless viscous oils to white solids depending on their molecular weight (i. e., the value of $n$), the higher molecular weight polyesters being solid in nature.

Various types of linear polyesters which are suitable for use in the reaction of this invention and methods of preparing them from a beta-lactone are set forth below:

(1) Polyester acids produced by the polymerization of beta-propiolactone by heating either in the presence or absence of a catalyst in which event the polyester acids have the general structure:

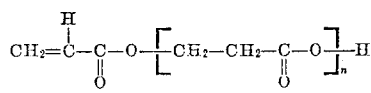

or

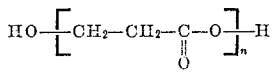

depending on whether or not a molecule of water is eliminated from the terminal

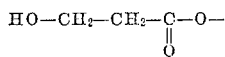

radical. The value of $n$ depends upon the time and temperature of the polymerization.

(2) Polyester acids produced by the reaction of beta-propiolactone, preferably in excess, with an alkali metal salt of a carboxylic acid in the presence of a polar solvent, preferably water. Such polyester acids possess the formula

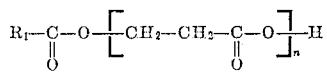

wherein

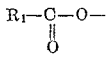

represents an acyloxy radical derived from any carboxylic acid and the value of $n$ depends upon the number of moles of lactone used.

(3) Polyester acids produced by the reaction of an excess of beta-propiolactone with alkali metal halides in the presence of a polar solvent, preferably water. Polyester acids prepared by this method possess the structure

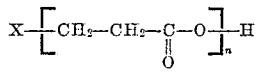

wherein X is halogen such as chlorine, bromine, or iodine and the value of $n$ depends upon the amount of lactone used.

(4) Polyester acids produced by the reaction of an excess of beta-propiolactone with an alkanol $R_2OH$ in the presence of an acid catalyst. Such polyester acids possess the structure

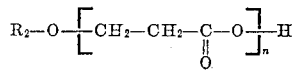

wherein $R_2$ is an alkyl radical and $n$ depends upon the amount of lactone utilized.

(5) Alkyl esters of polyester acids produced by the reaction of an excess of beta-propiolactone with an alkanol in the presence of an alkaline catalyst in which event the polyester formed possesses the structure

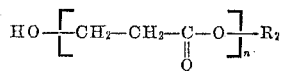

wherein $R_2$ is an alkyl radical and $n$ depends on the number of moles of lactone utilized.

While the above types of linear polyesters have been specifically described with relation to beta-propiolactone, it is to be understood that entirely similar linear polyesters are obtained from the other aliphatic beta-lactones described above. Moreover, it will be understood that any polyester possessing the structure

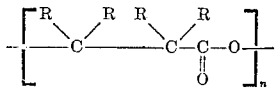

whether obtained by the methods in paragraphs (1) to (5) above or in some other way may be used in this invention.

Substantially one mole of the beta-hydroxy carboxylic acid amide is formed for each lactone unit present in the polyester used. In addition to the beta-hydroxy carboxylic acid amide, however, ammonia and another compound are formed in instances where the end group in a polyester acid is other than a hydroxy group. For example, if the polyester acid is formed simply by polymerization of beta-propiolactone in the presence of heat, or by polymerizing beta-propiolactone in the presence of a polymerization catalyst such as sulfuric acid or ferric chloride, some acrylamide is formed from the end group

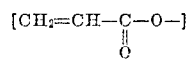

of the polyester acid

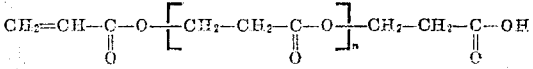

and the excess ammonia or amine, if any, used in the reaction.

Also, when a polyester acid formed from beta-propiolactone and sodium acetate is reacted with an alcohol in accordance with this invention acetamide is formed from the end group

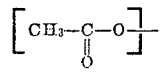

and similarly, when a polyester acid formed from beta-propiolactone and sodium chloride is reacted with ammonia or amine, some beta-chloropropionamide is formed from the splitting off of the end group

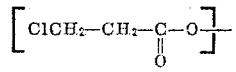

Either ammonia or an amine may be used in the aminolysis reaction of this invention. When an amine is used its nature may be varied widely. For example it may be any monoamine which has at least one hydrogen atom attached to the amino nitrogen atom and which is composed of hydrocarbon structure attached to the amino group. Structurally, ammonia and such amines may be represented as follows:

wherein each of $R_1$ and $R_2$ is selected from the class consisting of hydrogen atoms, alkyl and aryl radicals. Specific compounds which possess this formula include ammonia and primary amines such as methylamine, ethylamine, propylamine, butylamine, hexylamine, alkylamine, aniline, m-toluidene, mesidine, cyclohexylamine, benzylamine, 1-naphthylamine, 1-naphthalenemethylamine, 1-fluorenamine and the like. Also included are secondary amines such as dimethylamine, diethylamine, dipropylamine, dibutylamine, dihexylamine, diallylamine, diphenylamine, N-phenylbenzylamine, N-allylpropylamine, N-cyclohexylheptylamine, phenylethylamine, and the like. All of theese amines consist of hydrocarbon structure attached to an amino group which amino group has at least one hydrogen atom attached to nitrogen.

Although any polyester of the class described and ammonia or any amine of the type disclosed hereinabove may be utilized successfully in the reaction of this invention, best results are obtained when polyesters derived from beta-propiolactone are reacted with ammonia or with saturated aliphatic primary and secondary monoamines, preferably containing from 1 to 6 carbon atoms such as methylamine, ethylamine, propylamine, butylamine, amylamine, hexylamine, dimethylamine, diethylamine and dipropylamine to form the corresponding amide of hydracrylic acid.

The quantity of ammonia or amine used depends largely on the number of lactone units in each molecule of polyester, but in general it may be stated that it is desirable to use an excess of 2 to 5 moles of ammonia or amine in addition to one mole of amine for each lactone unit in order to obtain solution of the polyester in the amine and to maintain a satisfactory reaction rate.

The reaction is best carried out by placing the polyester and the amine in a suitable reactor fitted with a reflux condenser and temperature measuring means. The reactants are then heated, preferably to reflux temperature, which is generally in the range of from 50° C. to 150° C., for a period of time which varies in relation to the number of lactone units per molecule, but which is generally from 5 to 50 hours. The resulting reaction mixture is then distilled, preferably at reduced pressure to give the pure amide of a beta-hydroxy carboxylic acid. When ammonia or low boiling amines such as methylamine are utilized, the reaction is most advantageously carried out in an autoclave or other pressure reaction equipment.

Although an excess of the amine is often very successfully employed as a solvent for the reaction, other common solvents such as water, carbon tetrachloride, benzene, ether and the like may also be used satisfactorily.

The following examples, in which all parts are by weight, illustrate in more detail the reaction of this invention.

*Example I*

72 parts (1 mole) of beta-propiolactone are polymerized in the presence of about 0.1% by weight of concentrated sulfuric acid to a solid material having a molecular weight of about 860. When the polymerization is substantially complete (as evidenced by cessation of heat evolution), 146 parts (2 moles) of diethylamine are added to the polymer while the mixture is constantly stirred. The mixture is then refluxed for eight hours and the resulting reaction product distilled at reduced pressure. 81 parts (67%) of N,N-diethyl hydracrylamide (53° C./0.07 mm.) are obtained.

*Example II*

A suspension of 72 parts (1 mole) of a polymer of beta-propiolactone in 200 parts of aqueous N-methylamine is shaken periodically for 24 hours at which time solution is complete. The solution is then maintained at room temperature for about 100 hours after which the water and excess amine are removed at reduced pressure and the residue distilled at reduced pressure to give 60 parts of N-methyl hydracrylamide (B. P. 113–114° C./0.1 mm. $N_D^{25}=1.4720$).

When the above examples are repeated using ammonia or other of the amines listed hereinabove, the corresponding amides of hydracrylic acid are produced in good yields. For example, ammonia and beta-propiolactone polyester react to give hydracrylamide; hexylamine reacts with beta-propiolactone polyester to give N-hexyl hydracrylamide; dipropylamine reacts with beta-propiolactone polyester to give N,N-dipropyl hydracrylamide; diphenylamine reacts with beta-propiolactone polyester to give N,N-diphenyl hydracrylamide; and aniline reacts with beta-propiolactone polyester to give N-phenyl hydracrylamide. Similarly, when polyesters derived from other beta-lactones are substituted for beta-propiolactone polyesters, amides of beta-hydroxy carboxylic acids having one or more alkyl substituents on the alpha and beta carbon atoms are obtained.

The amides of beta-hydroxy carboxylic acids (hydracrylamides) prepared according to this invention are very valuable chemical compounds. For example, such hydracrylamides are readily converted to the corresponding acrylamide by the removal of a molecule of water, the acrylamides thus obtained being very valuable polymerizable materials. The compounds obtained by the process of this invention are also useful as solvents, as intermediates in the preparation of other chemical compounds and for many other uses.

In addition to providing a convenient method for the preparation of amides of beta-hydroxy carboxylic acids, this invention also provides a convenient and economical means of utilizing residues resulting from the manufacture of beta-lactones. For example, the residues often obtained in the reaction of ketene with formaldehyde, after removal of monomeric beta-propiolactone, contain beta-propiolactone polymers, which have heretofore been of no particular utility, but when such residues are reacted with amines according to this invention, valuable hydracrylamides are secured. Similarly, normally wasted high boiling polyester residues are formed in other reactions involving beta-propiolactone (including the reaction of beta-propiolactone with salts of carboxylic acids to form beta-acetoxy propionic acids, the reaction of beta-propiolactone with sodium chloride to form beta-chloropropionic acid, etc.) and may also be reacted with amines according to this invention to yield hydracrylamides.

Although specific examples of the invention are included herein, it is not intended to limit the invention solely thereto, for numerous modifications will be apparent to those skilled in the art, and are included within the scope of the appended claims.

I claim:

1. The method of preparing an amide of a beta-hydroxy carboxylic acid which comprises bringing together a compound of the formula

wherein each of $R_1$ and $R_2$ is selected from the class consisting of hydrogen, alkyl and aryl, with a polyester acid derived from a saturated aliphatic beta-lactone and containing a plurality of connected lactone units of the structure

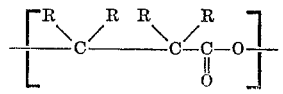

wherein R is a member of the class consisting of hydrogen and alkyl radicals.

2. The method of preparing an amide of a beta-hydroxy carboxylic acid which comprises bringing together at reflux temperature a monoamine of the structure

wherein $R_1$ and $R_2$ represent alkyl radicals with a linear polyester derived from a saturated aliphatic beta-lactone and containing a plurality of connected lactone units of the structure

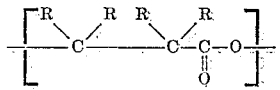

wherein each R is a member of the class consisting of hydrogen and alkyl radicals.

3. The method of preparing an amide of hydracrylic acid which comprises bringing together at reflux temperature a molar excess of a primary monoamine composed of saturated hydrocarbon structure attached by a single valence bond to the nitrogen atom of the amino group, with a polyester acid derived from beta-propiolactone and containing a plurality of connected lactone units of the structure

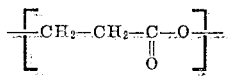

4. The method of claim 3 wherein the primary monoamine utilized is methylamine, the amide of hydracrylic acid prepared being N-methyl hydracrylamide.

5. The method of preparing an amide of hydracrylic acid which comprises bringing together at reflux temperature a molar excess of a secondary monoamine of the structure

wherein $R_1$ and $R_2$ represent alkyl radicals with a polyester acid derived from beta-propiolactone and containing a plurality of connected lactone units of the structure

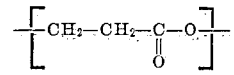

6. The method of claim 5 wherein the secondary monoamine utilized is diethylamine, the amide of hydracrylic acid prepared being N,N-diethyl hydracrylamide.

JACOB EDEN JANSEN.

REFERENCES CITED

The following references are of record in the file of this patent:

UNITED STATES PATENTS

| Number | Name | Date |
| --- | --- | --- |
| 2,375,005 | Kung | May 1, 1945 |
| 2,539,473 | Ratchford | Jan. 30, 1951 |